United States Patent
Song et al.

(10) Patent No.: US 9,258,533 B2
(45) Date of Patent: Feb. 9, 2016

(54) METHOD FOR CONFIGURING A MONITORING SYSTEM AND CONFIGURABLE MONITORING SYSTEM

(75) Inventors: Miao Song, Berlin (DE); Stefan Pohl, Berlin (DE)

(73) Assignee: Hella KGAA Hueck & Co. (DE)

( * ) Notice: Subject to any disclaimer, the term of this patent is extended or adjusted under 35 U.S.C. 154(b) by 397 days.

(21) Appl. No.: 13/818,140

(22) PCT Filed: Sep. 20, 2011

(86) PCT No.: PCT/EP2011/004764
§ 371 (c)(1),
(2), (4) Date: May 6, 2013

(87) PCT Pub. No.: WO2012/038087
PCT Pub. Date: Mar. 29, 2012

(65) Prior Publication Data
US 2013/0222545 A1    Aug. 29, 2013

(30) Foreign Application Priority Data

Sep. 21, 2010    (DE) .......................... 10 2010 046 220

(51) Int. Cl.
*G06K 9/00*    (2006.01)
*H04N 7/18*    (2006.01)
*G07C 9/00*    (2006.01)

(52) U.S. Cl.
CPC ............ *H04N 7/181* (2013.01); *G06K 9/00657* (2013.01); *G06K 9/00771* (2013.01); *G07C 9/00* (2013.01)

(58) Field of Classification Search
CPC .................................... G06K 9/62; H05N 7/18
USPC ............................................. 382/225; 348/46
See application file for complete search history.

(56) References Cited

U.S. PATENT DOCUMENTS 6,771,818 B1 *  8/2004  Krumm et al. ................ 382/225
2001/0048470 A1 * 12/2001 Lampert et al. ............... 348/143
(Continued)

FOREIGN PATENT DOCUMENTS

DE        10138960         2/2003
DE     102005009626 A1     8/2006
(Continued)

OTHER PUBLICATIONS

"International Application No. PCT/EP2011/004764, International Search Report and Written Opinion mailed Apr. 20, 2012", 14 pgs.
(Continued)

*Primary Examiner* — Nirav G Patel
*Assistant Examiner* — Delomia Gilliard
(74) *Attorney, Agent, or Firm* — Schwegman Lundberg & Woessner, P.A.

(57) ABSTRACT

The invention relates to a method for configuring a monitoring system which is based on a recording of altitude maps, comprising the following steps:—an altitude map of a monitored area is recorded with the monitoring system in a state in which no objects or persons to be detected are located in the monitored area,—determination of destruction points, caused by obstacles, in the altitude map which is recorded in this way,—definition of a detection area as a component area of the altitude map in such a way that all the disruption points, or at least some of said disruption points, lie outside the detection area,—setting of an evaluation unit of the monitoring system such that it only evaluates movements within the detection area. The invention also relates to a correspondingly configurable monitoring system.

14 Claims, 7 Drawing Sheets

(56) References Cited

U.S. PATENT DOCUMENTS

Figure 1:
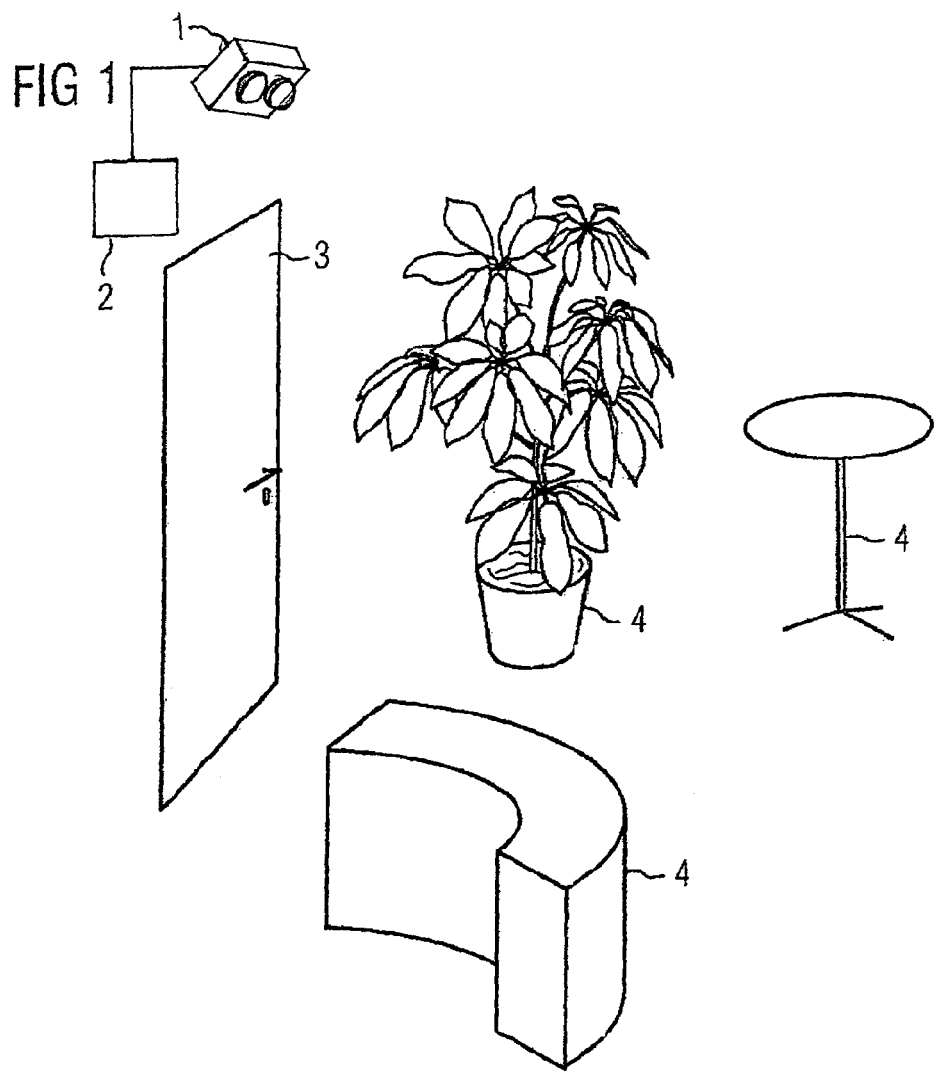

| | | |
|---|---|---|
| 2005/0094879 A1 | 5/2005 | Harville |
| 2005/0201612 A1 | 9/2005 | Park et al. |
| 2009/0010490 A1 | 1/2009 | Wang et al. |
| 2010/0195865 A1 | 8/2010 | Luff |

FOREIGN PATENT DOCUMENTS

| | | | |
|---|---|---|---|
| EP | 0853299 | A2 | 7/1998 |
| WO | WO-2005/067424 | A2 | 7/2005 |

OTHER PUBLICATIONS

"German Application No. 10 2010 046 220.9, Search Report mailed Mar. 6, 2013", 5 pgs.

"International Application No. PCT/EP2011/004764, English Translation of International Preliminary Report on Patentability mailed Apr. 4, 2013", 10 pgs.

* cited by examiner

METHOD FOR CONFIGURING A MONITORING SYSTEM AND CONFIGURABLE MONITORING SYSTEM

The invention relates to a method for configuring a monitoring system based on a recording of relief maps, as well as to a monitoring system which can be configured accordingly.

PRIORITY CLAIM TO RELATED APPLICATIONS

This application is a national stage application under 35 U.S.C. §371 of PCT/EP2011/004764, filed Sep. 20, 2011, and published as WO 2012/038087 A2 on Mar. 29, 2012, which claims priority to German Application No. 10 2010 046 220.9, filed Sep. 21, 2010, which applications and publication are incorporated by reference as if reproduced herein and made a part hereof in their entirety, and the benefit of priority of each of which is claimed herein.

With this monitoring system, it can e.g. be the case of a person-counting system or of another counter. Such monitoring systems are set up to evaluate recorded relief maps of a monitored region, in order to ascertain movements in the relief map, e.g. movements of persons or objects from an entrance region to an exit region. Thereby, here and hereinafter, a relief map very generally indicates a picture which contains depth information.

If then obstacles are located within the monitored region, these are also imaged in the relief map. In particular, if the obstacles are of the same order of magnitude or are of a comparable height to the moved objects or persons to be detected, then problems can occur due to the fact that these objects or persons in the relief map blend in with the obstacles, and on account of this, under certain circumstances, can no longer be detected in an unambiguous manner. This can lead to errors, and in the case of counting systems e.g. can lead to the passage of an object or a person not being counted.

It is the object of the present invention, to overcome the outlined problems, thus to suggest a monitoring system or a method for operating a monitoring system, with which the erroneous detections caused by obstacles in the monitored space (room) can be prevented.

According to the invention, this object is achieved by a method for configuring a monitoring system based on a recording of relief maps, with the features of the main claim, as well as by a configurable monitoring system with the features of the auxiliary claim. Advantageous designs and further developments of the invention are to be deduced from the features of the dependent claims.

The suggested method comprises the following steps:
recording a relief map of a monitored region with a monitoring system in a condition, in which none of the objects or persons to be detected are located in the monitored region,
determining disruption locations caused by obstacles, in the thus recorded relief map,
defining a detection region as a part region of the relief map, in a manner such that all or at least a part of the disruption locations lie outside the detection region,
setting an evaluation unit of the monitoring system in a manner such that it only evaluates movements within the detection region.

On account of this, the previously described problem is avoided, since no or at least no longer so many obstacles, which with an operation of the monitoring system are recorded after the configuration, show up in the relief maps. On account of this, one avoids disruption locations with depth information which is insignificant for the monitoring, becoming a hindrance with the evaluation of the relief maps.

With regard to the monitoring system, it can in particular be the case of a person-counting system or another counter. In this case, thus no objects or persons to be counted should be located in the monitored region if the relief map is recorded in the framework of the configuration.

The relief maps can e.g. be obtained with the help of a stereo-camera of the monitoring system, by way of stereo-picture recorded with the stereo-camera being evaluated for determining depth information. The stereo-camera can e.g. be directed from above or obliquely from above onto the monitored region.

The disruption locations can be defined as regions of the relief map, in which height values of the relief map exceed a threshold value. Thereby, it is possible for the threshold value to be defined differently for different regions of the relief map, if e.g. the relief map is obtained with a camera system which is directed obliquely onto the monitored region.

The setting of the evaluation unit can be effected according to the previous steps, such that all height values of recorded relief maps outside the detection region are set to zero or another predefined value A preferred embodiment of the method envisages the following sub-steps being carried out for defining the detection region:
defining a window as a part region of the relief map which connects an entrance region to an exit region,
varying edges (forming a polygon course and preferably a rectangle) of the window amid the retention of constraints, and determining an edge course, with which a number of disruption locations within the window is minimised.

The window can thereby be defined such that the edges of the window form a polygon course, in a simple embodiment e.g. a rectangle or parallelogram Preferably, the steps of the method, in particular the determining of the obstacles in the relief map recorded for the configuration, the defining of the detection regions and the setting of the evaluation unit which is dependent on this, are carried out automatically by way of a suitable programming of the evaluation unit. This also applies to possible present sub-steps of the method.

The entrance region and the exit region which are connected by the window can e.g. be defined by two edges of the relief map which lie opposite one another or by parts of edges of the relief map which lie opposite one another. They should be selected such that a movement of objects or persons to be counted leads from the entrance region to the exit region.

One can envisage the edges of the window only being varied within lateral limitations of a search region which are previously defined, by way of in each case a line being displaced from an edge of the relief map by a limited value, in the direction of the picture middle, and, inasmuch as this line thereby meets disruption locations, a course of this line, at which the line meets the disruption location for the first time, being selected as the limitation. Otherwise, the respective edge of the relief map can itself be fixed as a lateral limitation. The lines can thereby e.g. in each case be given by a picture line or a picture column. Additionally or alternatively, of course also other constraints for the variation of the edges or of the window can be set.

The variation of the edges of the window can be effected in a different manner and in each case follow an algorithm. In one embodiment of the method which is particularly simply realisable and which leads to satisfactory results, the edges of the window can be varied in a manner such that the window or a part of the window firstly has a defined size and shape—e.g. a rectangular shape—and without changing the size and shape is displaced over the relief map—as the case may be for example from a first up to a second of the mentioned limitations—and thereby a position of the window, at which the number of disruption locations within the window is minimised being determined, whereupon departing from this position of the window, at least one of the edges of the window is displaced exactly so far in a direction enlarging the window, preferably in a parallel manner, until the number of disruption locations within the window begins to increase again.

A correspondingly advantageous configurable monitoring system comprises a camera system preferably given by a stereo-camera, for recording relief maps of a monitored region and an evaluation unit which with regard to programming technology is set up for evaluating relief maps which are recorded by the camera system and for detecting changes between temporally consecutive relief maps, thus for detecting movements. Moreover, the evaluation unit with regard to programming technology is further set up for the preferably automatic implementation of the following steps which are activated by a configuration command:

determining disruption locations caused by obstacles, in a relief map recorded with the camera system, defining a detection region as a part region of the relief map, in a manner such that all or at least a part of the disruption locations lie outside the detection region, setting the evaluation unit in a manner such that it only evaluates movements within the detection region.

These steps can in particular be designed as described above in the context of the method. The monitoring system can in particular be a person-counting system or another counter and due to the described design of the evaluation unit, is suitable to be configured by the previously explained method or to configure itself and thus to be adapted to a certain initial situation in the monitored region.

Figure 4:
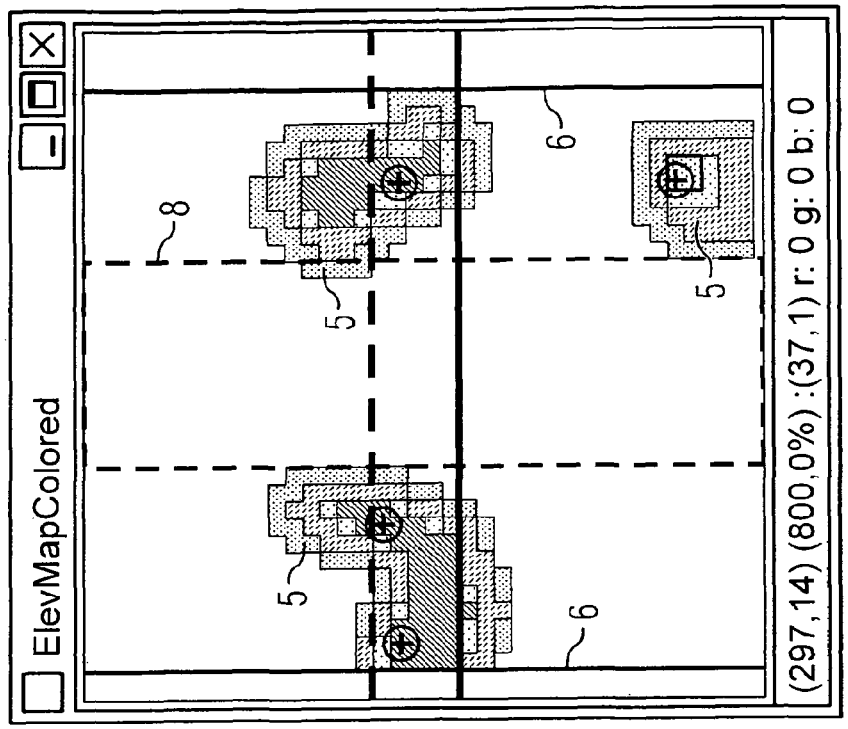
Figure 5:
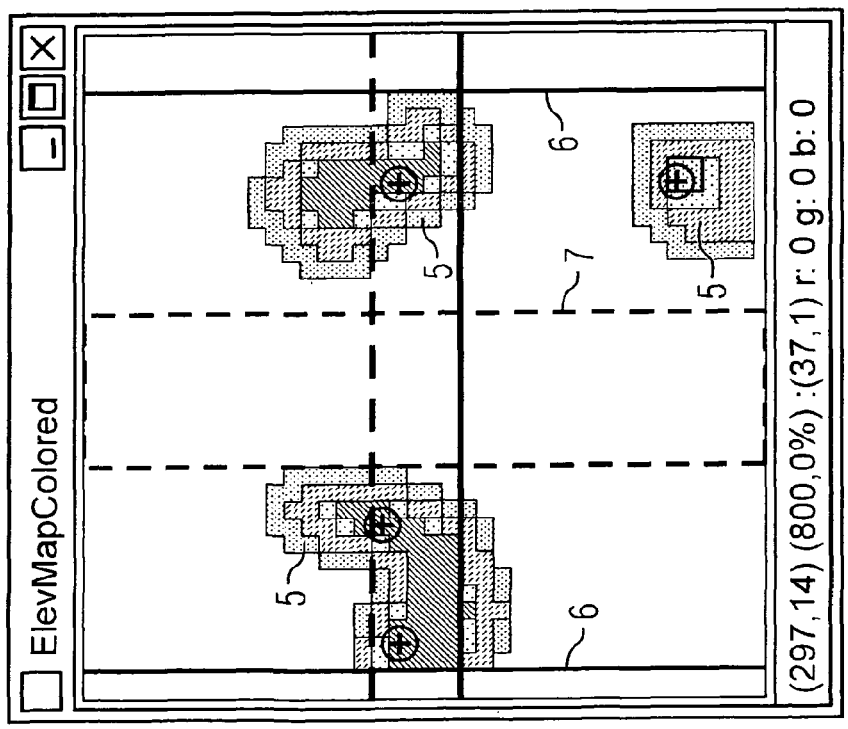
Figure 6:
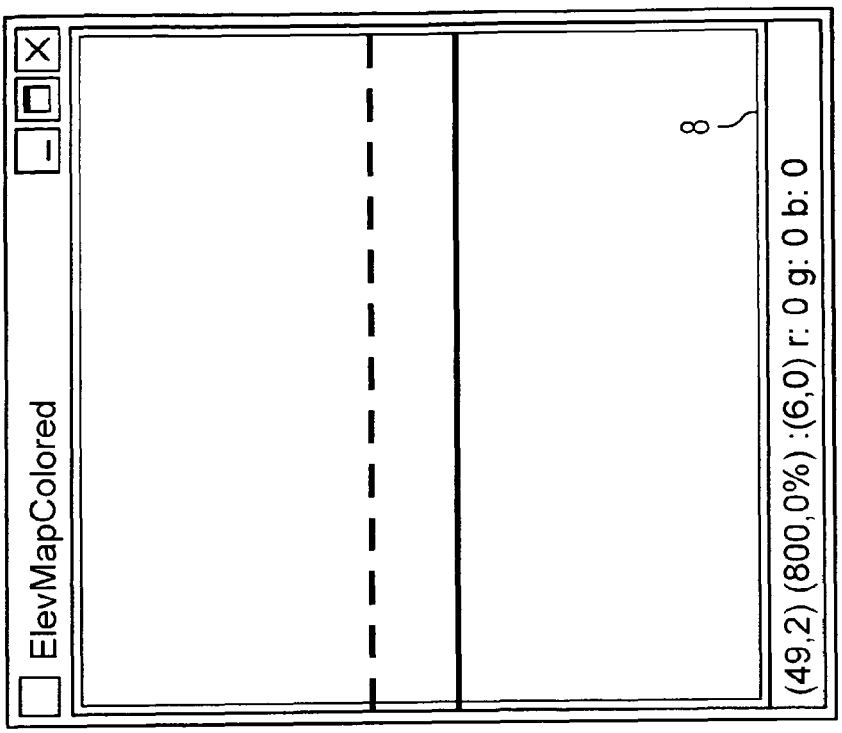
Figure 7:
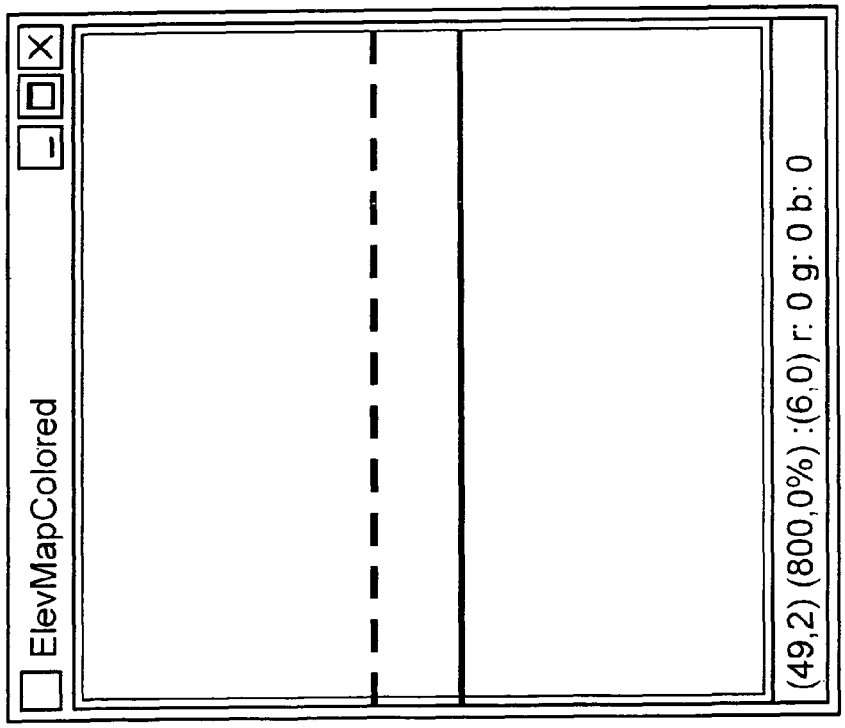

One embodiment example of the invention is hereinafter explained by way of the FIGS. 1 to 13. There are shown in:

FIG. 1 a counting system for counting persons entering through a door, and a monitored space which is monitored by this counting system, FIGS. 2 to 5 in each case, a relief map of the monitored space which is recorded with the counting system, in four consecutive working steps of a method for configuring the monitoring system, FIG. 6 in a corresponding representation, a relief map with another situation in the monitored region, FIG. 7 a corresponding representation of the same relief map after a manipulation carried out by the method for configuration, FIGS. 8 to 13 in a manner corresponding to the FIGS. 6 and 7, and for three further differing situations in respectively consecutive figures, the relief map before and after a manipulation carried out by the method.

The counting system which is represented in FIG. 1 and which is hereinafter indicated as a counter, comprises a stereo-camera 1 directed onto a monitored region and an evaluation unit 2, with which picture data obtained by the stereo-camera 1 is evaluated. The counting system here should serve for counting persons which enter through a door 3 which is located directly behind the monitored region. Here, a few obstacles 4 are located in the monitored region itself. The obstacles 4 are here represented as pot-plants, a bar and a bistro-style table, but can also be given by other objects, e.g. by a door or a hand-rail. The counting system can also be used in other environments, for example a bus. The same or a comparable counting system can finally also be used for counting other objects transported through a monitored region.

A main algorithm of the counter, according to which the evaluation unit 2 operates, is based on computing relief maps from stereo-pictures recorded by the stereo-camera and evaluating these relief maps. For this, the evaluation unit 2 is set up in particular for detecting changes between temporally consecutive relief maps.

With the installation of the counter, the obstacles 4 which under certain circumstances may not or cannot be removed, can lead to a failure or wrong functioning of the counting system if no further measures are taken. Such obstacles 4 are then specifically reconstituted on the recorded relief map. If persons approach these objects, they can blend in with the objects on the relief map. This in turn leads to poor counting results, since mistakes occur with the picture evaluation. Images of such obstacles 4 are here indicated as disruption locations.

In order to blank out the disruption locations occurring on the relief map, now a limited detection region is set as a part region of the relief map, which hereinafter is also indicated as ROI (region of interest). Height values outside of the ROI are set to zero or to another defined value, by which means the obstacles 4 are faded out and can no longer blend in with the obstacles 4. This means that only the movements or persons or objects in the ROI are considered, which is why the counting accuracy is directly dependent on the definition of the ROI. The detection region or the ROI in the framework of a configuration can be determined in a one-off manner on installation or at other defined points in time, with the help of the method described here. The fixing can either be effected by an installer, with automatic support or in a completely automatic manner.

The method described here automatically determines a ROI which is optimal under certain constraints, on the relief map, in order to secure a robust, satisfactory counting accuracy of the counting system. Thereby, the method does not compromise the computation time of the hardware. If possible, no disruption locations should occur in a passage region which is crossed by a person to be counted.

With the method for configuring the counting system, firstly with the help of a stereo-camera 1, a relief map of the monitored region is recorded in a condition, in which no objects or persons to be detected are located in the monitored region. Then disruption location 5 caused by the obstacles 4 are determined in the thus recorded relief map by the evaluation unit 2 which is suitably programmed for this, and the ROI as a part region of the relief map is defined in a manner such that all or at least a part of the disruption locations 5 lie outside the ROI. Thereby, the disruption locations 5 are recognised as regions, in which the height values exceed a certain—under certain circumstances location-dependent—threshold value. The definition of the ROI is effected e.g. in the manner described hereinafter in more detail. Finally, the evaluation unit 2 is set in a manner such that it only evaluates movements within the ROI for counting passing persons or objects. This can be effected in the simplest case by way of the height values outside the ROI being set to zero or to another defined value, which when detecting movements of persons or objects is not a hindrance.

Figure 2:
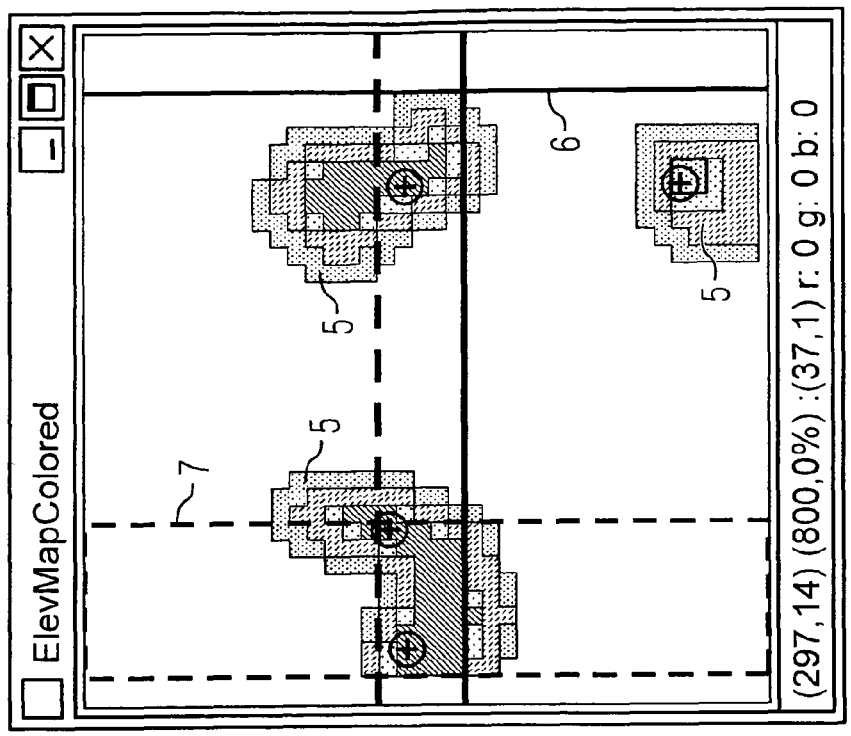

The relief map which is recorded for carrying out this method or is obtained by way of evaluation of a recorded stereo-picture is represented in FIG. 2. The obstacles 4 recognisable in FIG. 1 are reflected in disruption locations 5 of this relief map. The passage region on this relief map runs from the top to the bottom. The further course of the method comprises several steps: if disruption locations 5 as here are located at the sides of the relief map, firstly positions of the outermost edges of the lateral disruption locations 5 are determined For this, here from the right and left of the edge of the relief map and in the direction of the centre of the relief map, one examines for each column of the relief map, as to whether the respective column contains disruption locations 5, thus meets a disruption location 5 at any location. With another orientation, of course one can also displace picture lines instead of picture columns in a corresponding manner, and carry out this examination. The procedure is finished when a column with disruption locations 5 is found. The found columns correspond to the outermost edges of the lateral disruption locations 5. These columns are then defined as lateral limitations 6 of a search region which are drawn in FIG. 2 and run there in a vertical manner. If in a region of a given width, no columns with disruption locations 5 are found, then instead of this, the lateral edges of the relief map are defined themselves as lateral limitations 6 of the search region. The ROI from now on is only searched within the limitations 6.

Figure 3:
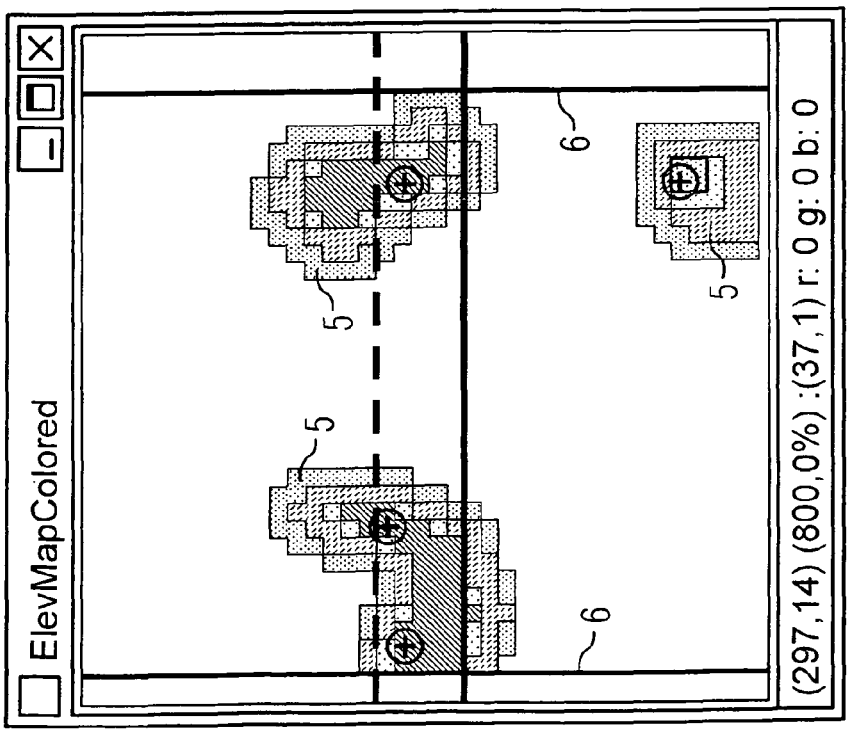

As is shown in FIGS. 3 and 4, for this, a window of a given window size—corresponding roughly to the width of the door 3—and of a given shape—here in the form of a rectangle—is shifted from the left to the right through the search region. Thereby, the window 7 with the least disruption locations is searched in the horizontal direction between the edges determined in step 1. The thus determined window 7 is shown in FIG. 4.

Now, the right edge of the window found in the previous step is displaced to the right and the window 7 widened by way of this, until the right edge contacts further disruption locations 5. The thus obtained shape and position of the window 7 now defines the detection region 8 which is represented in FIG. 5, thus the final ROI.

The window 7 with the steps shown in FIGS. 3 to 5 is defined such that it connects an entrance region to an exit region, wherein a special case is present, in which the entrance region is formed by the edge which is at the very top, and the exit region by the edge which is at the very bottom. Modifications however are also conceivable, with which the entrance region and exit region are defined differently or in a narrower manner, so that further constraints result. Thereby, the entrance and exit region can also have individual minimal widths. The window 7 can also—in particular with differently defined entrance and exit regions—have other polygonal shapes and be varied differently, so that also infinitely complex or simple symmetrical polygon courses as ROI can be automatically computed. One can also envisage disruption locations having certain characteristics thereby being ignored.

The described method has a very low computation effort and therefore requires very little hardware resources. The preferred embodiment which is described here simplifies the work of the installation, since the ROI does not need to be fixed manually by the installer. There is also the possibility of reacting to a change of the environment at any point in time, by way of a suitable new configuration, without human intervention. The configuration can thereby be activated in each case by way of a suitable input at the evaluation unit, as a configuration command. A manual readjustment is possible in the case of an error.

The remaining figures show the relief map which serves as a starting point and which is obtained with the stereocamera, and a relief map which is manipulated in the described manner by the configuring, for different situations which differ by different arrangements of obstacles 4 in the monitored region. The final relief map thereby results in each case by way of the height values outside the ROI being set to a constant value.

FIG. 6 shows the relief map recorded for the configuring, in the case of a free monitored region without obstacles 4. Accordingly, this relief map displays no disruption locations 5. The detection region 8 which is computed for this case with the method is represented in FIG. 7 and corresponds to the complete relief map as expected. The ROI here thus has the maximal size.

As in FIGS. 6 and 7, also in the following pairs of figures—FIGS. 8 and 9, 10 and 11 as well as 12 and 13—in each two relief maps are represented for different situations. In the FIGS. 8, 10 and 12, the relief map recorded for the configuring is shown in each case before the implementation of the further steps of the method. The relief map after carrying out the method is to be seen in FIGS. 9, 11 and 13. The determined ROI is drawn in there in each case as a detection region 8.

Figure 9:
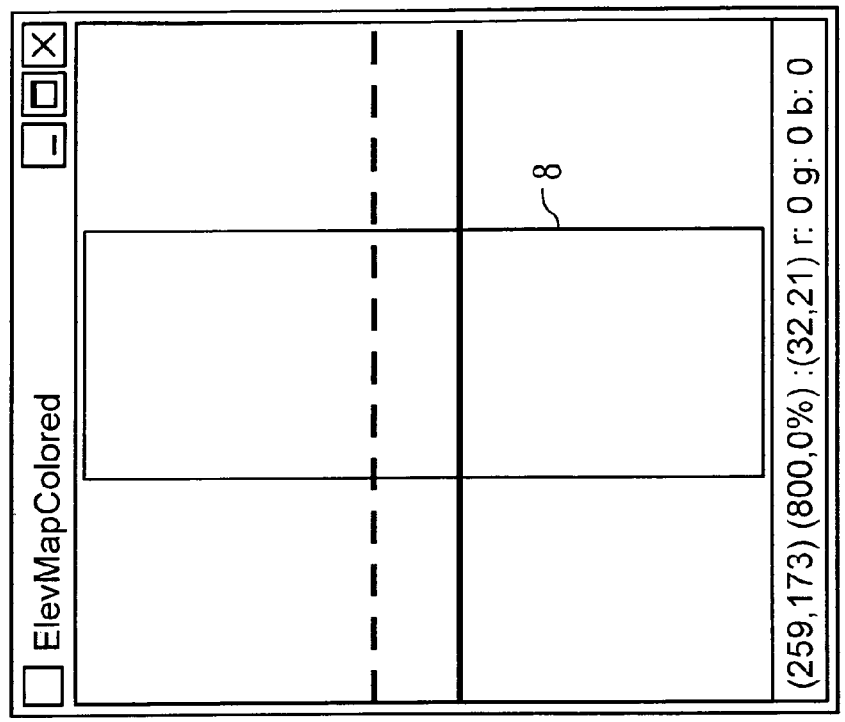
Figure 8:
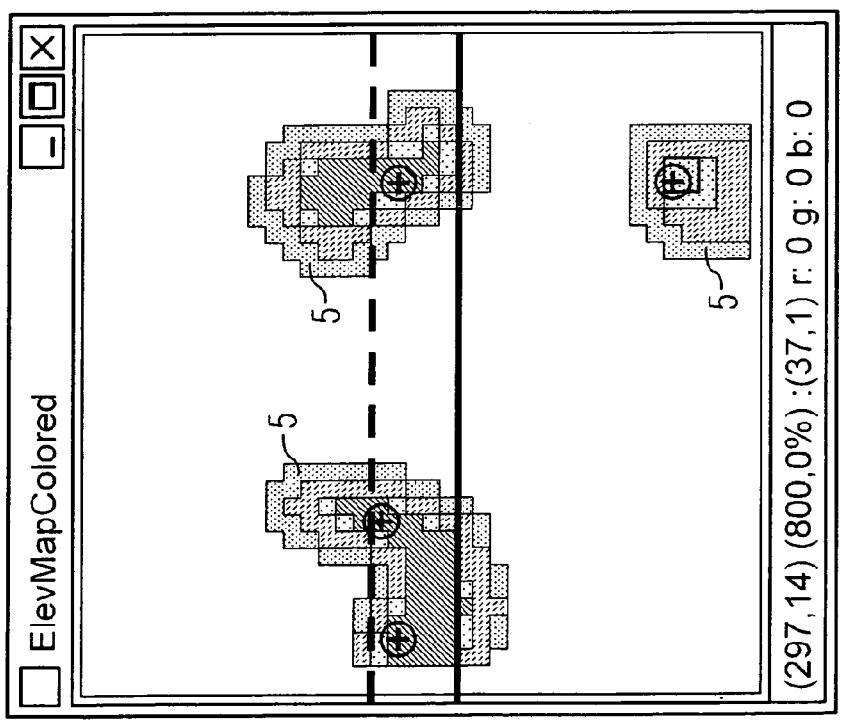

FIGS. 8 and 9 show a case with disruption locations 5 at the left and at the right side of the relief map, corresponding to obstacles 4 at the right and left side of the monitored region. This situation corresponds to that of the FIGS. 1 to 5. The result of the method corresponds to the expected result: the computed ROI lies exactly between the left edge of the right disruption locations 5 and the right edge of the left disruption locations 5.

Figure 10:
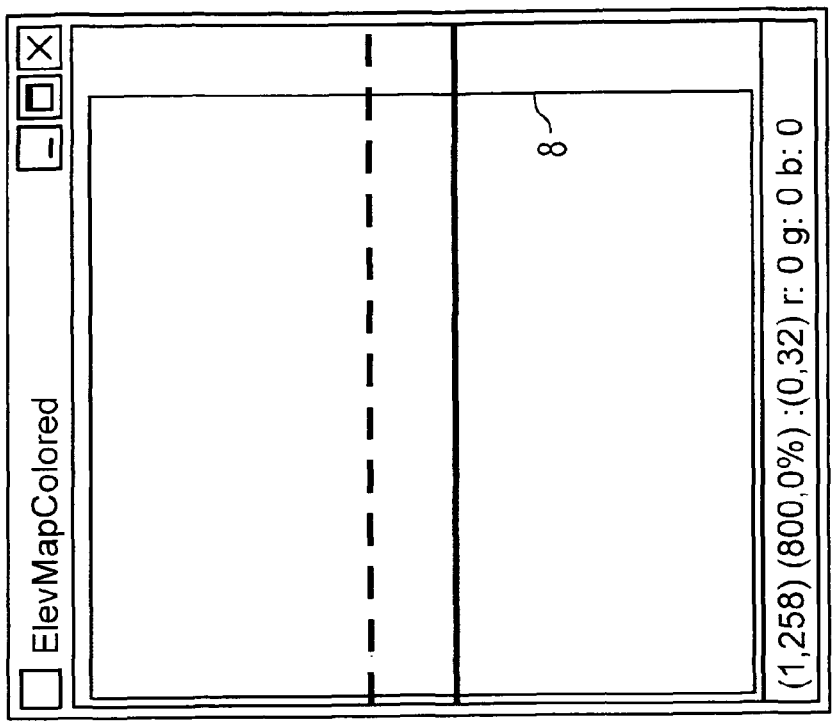
Figure 11:
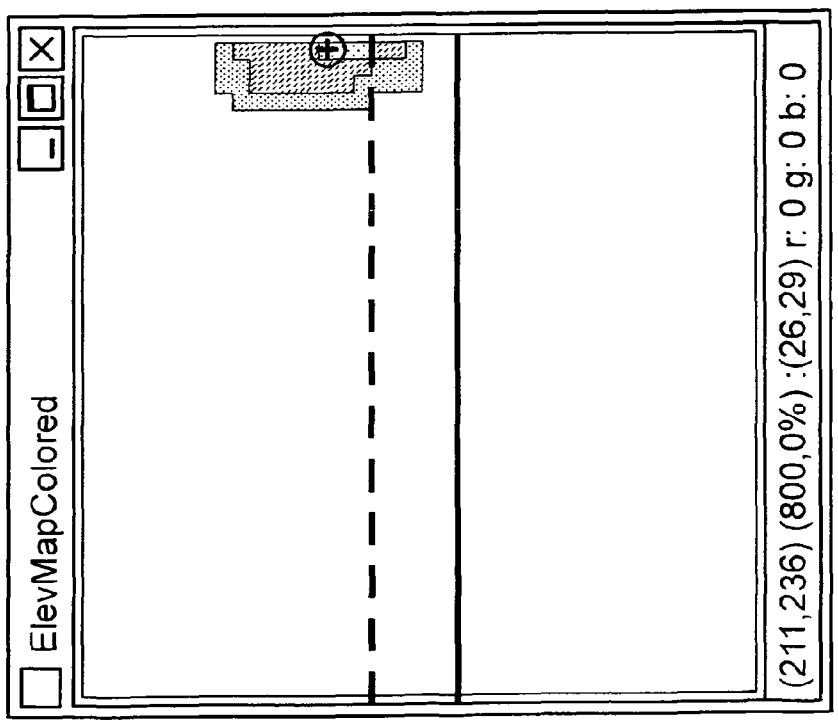

FIGS. 10 and 11 show a situation, with which disruption locations 5 only occur at the right side of the relief map. Again, the result of the method corresponds to the expectations: the left edge of the computed ROI corresponds to the left edge of the relief map, and the right edge of the ROI lies on the left edge of the disruption locations 5 lying at the right.

Figure 12:
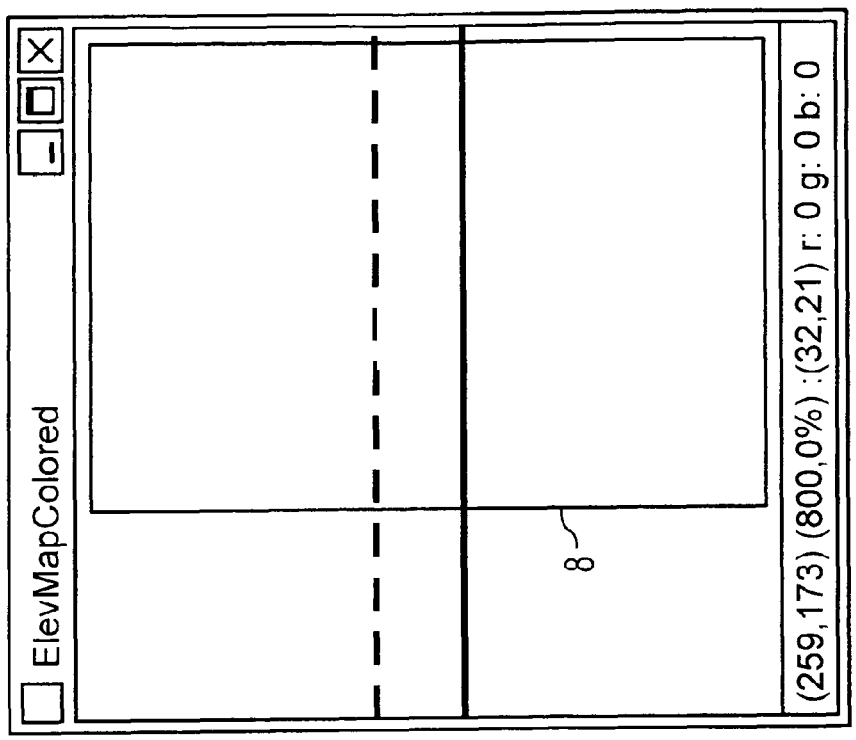
Figure 13:
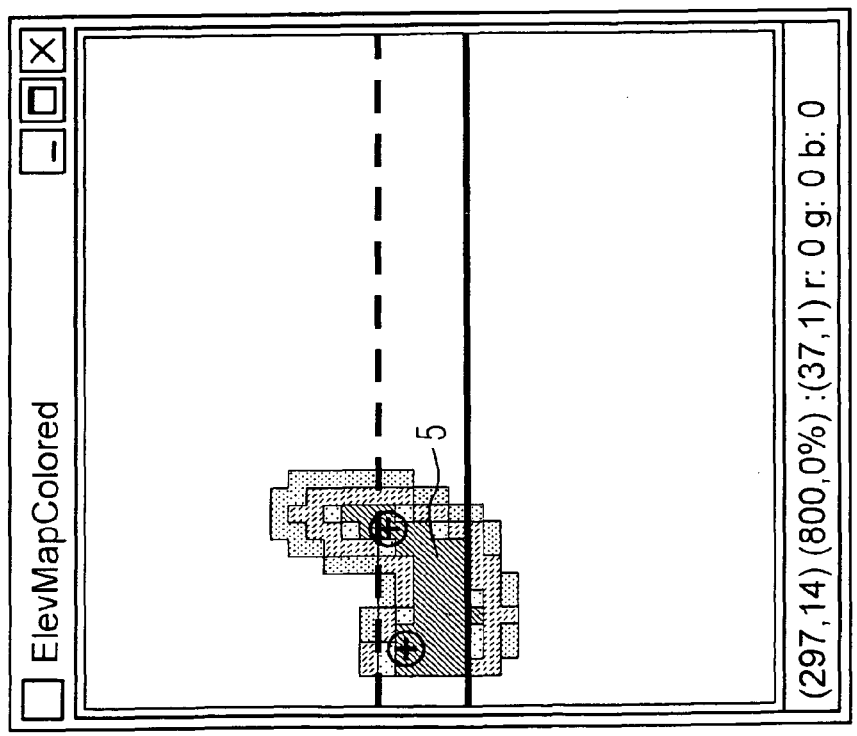

FIGS. 12 and 13 finally show a case, with which an obstacle 4 only occurs at a left side of the monitored region, so that the relief map shows disruption locations 5 only on the left side. Here, the right edge of the computed ROI corresponds to the right edge of the relief map, and the left edge of the ROI lies on the right edge of the disruption locations 5 lying at the left.

The method described here can finally also be combined with other methods for background segmentation. E.g. additional, temporary, thus non-statistic disruption locations in the monitored region can be eliminated with such a method known per se, if these disruption locations are present for a settable time duration. This elimination or removal of disruption locations can be carried out in a continuous manner and typically entails a time delay. If prior to this, a method for configuring is carried out as described, the computation effort for each further method for evaluating the background is reduced, since one can work with a reduced data set due to the limited detection region. A combination of both methods is therefore particularly advantageous.

The invention claimed is:

1. A method for configuring a monitoring system based on a recording of relief maps, the method comprising:
   recording a relief map of a monitored region with a monitoring system, in a condition in which none of the objects or persons to be detected are located in the monitored region,
   determining one or more disruption locations caused by one or more respective obstacles, in the thus recorded relief map,
   defining a detection region as a part region of the relief map, in a manner such that all or at least a part of the disruption locations lie outside the detection region, and setting an evaluation unit of the monitoring system in a manner such that it evaluates movements within the detection region, wherein defining the detection region comprises:
defining a window as a part region of the relief map, and varying edges of the window and determining an edge course, at which a number of disruption locations within the window is minimized.

2. The method according to claim 1, wherein the recording the relief map includes recording with a stereo-camera of the monitoring system.

3. The method according to claim 1, wherein the disruption locations are defined as regions of the relief map, in which height values of the relief map exceed a threshold value.

4. The method according to claim 3, wherein the threshold value is defined uniformly for different regions of the relief map.

5. The method according to claim 1, wherein all height values of recorded relief maps outside the detection region are set to a predefined value by way of setting the evaluation unit.

6. The method according to claim 1, wherein:
the part region of the relief map connects an entrance region to an exit region, and
wherein the edges of the window are varied amid the retention of constraints.

7. The method according to claim 6, wherein the entrance region and the exit region are defined by two edges of the relief map which lie opposite to one another, or by parts of edges of the relief map which lie opposite one another.

8. The method according to claim 6, wherein the edges of the window are only varied within lateral delimitations of a search region which are previously defined, by way of in each case a line being shifted from an edge of the relief map by a value limited to the top, in the direction of the picture middle, and, inasmuch as this line thereby meets a disruption location, a course of this line, at with which the line meets a disruption location for the first time, being selected as a limitation.

9. The method according to claim 6, wherein the edges of the window are varied in a manner such that the window or a part of the window firstly has a defined size and shape and without changing the size and shape is displaced over the relief map and thereby a position of the window, at which the number of disruption locations within the window is minimised, is determined, whereupon departing from this position of the window, at least one of the edges of the window is displaced so far in a direction enlarging the window, until the number of disruption locations within the window begins to increase again.

10. A configurable monitoring system, the system comprising:
a camera system, configured for recording relief maps of a monitored region, and
an evaluation unit, configured to evaluate relief maps recorded with the camera system, and for detecting changes between temporally consecutive relief maps,
wherein the evaluation unit is configured to carry out the following steps which can be activated by a configuration command:
determining one or more disruption locations caused by one or more respective obstacles, in a relief map recorded with the camera system,
defining a detection region as a part region of the relief map, in a manner such that all or at least a part of the disruption locations lie outside the detection region, and
setting the evaluation unit in a manner such that it evaluates movements within the detection region,
wherein defining the detection region comprises:
defining a window as a part region of the relief map, and varying edges of the window and determining an edge course, at which a number of disruption locations within the window is minimized.

11. The monitoring system according to claim 10, wherein it is a person-counting system or another counter.

12. The method according to claim 1, wherein setting the evaluation unit comprises setting the evaluation unit of the monitoring system in a manner such that it only evaluates movements within the detection region.

13. The method according to claim 3, wherein the threshold value is defined differently for different regions of the relief map.

14. The monitoring system according to claim 10, wherein setting the evaluation unit comprises setting the evaluation unit of the monitoring system in a manner such that it only evaluates movements within the detection region.

* * * * *